United States Patent
Lin et al.

(10) Patent No.: US 7,885,514 B2
(45) Date of Patent: Feb. 8, 2011

(54) APPARATUS AND METHOD FOR DETERMINING RENDERING DURATION OF VIDEO FRAME

(75) Inventors: Hsien-Li Lin, Yonghe (TW); Hsien-Ming Tsai, Jiali Township, Tainan County (TW); Zhi-Wei Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1129 days.

(21) Appl. No.: 11/594,047

(22) Filed: Nov. 6, 2006

(65) Prior Publication Data

US 2007/0223884 A1    Sep. 27, 2007

(30) Foreign Application Priority Data

Mar. 24, 2006  (TW) .............................. 95110412 A

(51) Int. Cl.
H04N 9/80 (2006.01)
(52) U.S. Cl. ...................................... 386/243; 386/248
(58) Field of Classification Search .................. 386/46, 386/95, 96, 98, 125, 126, 200, 243, 248
See application file for complete search history.

(56) References Cited

U.S. PATENT DOCUMENTS

| | | | |
|---|---|---|---|
| 6,134,243 A | 10/2000 | Jones et al. | |
| 6,646,655 B1 * | 11/2003 | Brandt et al. | 715/723 |
| 6,674,803 B1 | 1/2004 | Kesselring | |
| 6,701,059 B1 | 3/2004 | Yoo et al. | |
| 7,274,862 B2 * | 9/2007 | Komori | 386/99 |
| 2005/0259949 A1 * | 11/2005 | Habuta et al. | 386/46 |

FOREIGN PATENT DOCUMENTS

| | | |
|---|---|---|
| CN | 1175854 A | 8/1997 |
| CN | 1164105 C | 12/1998 |
| CN | 1402482 A | 7/2002 |
| TW | 200605678 | 7/2005 |

* cited by examiner

Primary Examiner—Huy T Nguyen
(74) Attorney, Agent, or Firm—Thomas, Kayden, Horstemeyer & Risley

(57) ABSTRACT

This invention provides a method and an apparatus for determining a rendering duration. An audio/video recording system is used for recording an audio bit stream and a video bit stream. The audio bit stream includes a plurality of audio frames. The video bit stream includes N video frames. According to this invention, the rendering durations of the first and the last video frames are determined based on the moments when the system starts to record the audio frames and the video frames. According to this invention, when the $(i+1)$th video frame through the $(i+N_L)$th video frame are lost, the rendering duration of the ith video frame is determined based on $N_L$. According to this invention, when the system receives a command of synchronization correction for the ith video frame, the rendering duration of the ith video frame is determined based on a correction value.

20 Claims, 6 Drawing Sheets

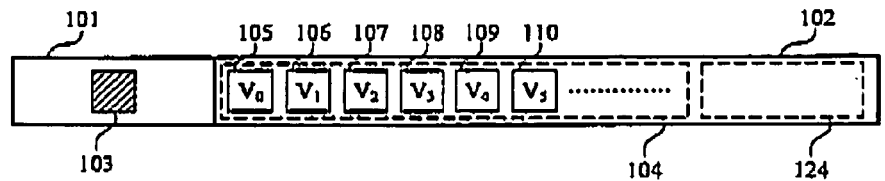
FIG. 1A (prior art)
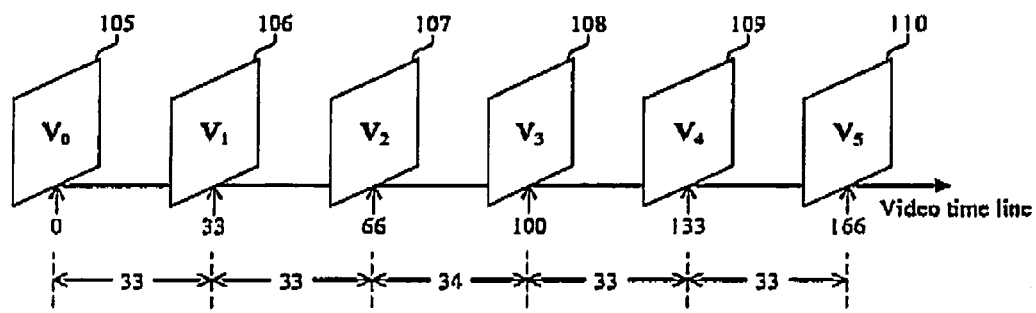
FIG. 1B (prior art)
FIG. 1C (prior art)

APPARATUS AND METHOD FOR DETERMINING RENDERING DURATION OF VIDEO FRAME

BACKGROUND OF THE INVENTION

1. Field of the Invention

The present invention relates to a method and apparatus for determining a rendering duration. More particularly, the method and apparatus is applied in an audio/video recording system, and it determines the rendering duration of a video frame based on various recording events.

2. Description of the Prior Art

Generally, a multimedia file includes a video bit stream and an audio bit stream. The video bit stream further includes a plurality of video frames, whereas the audio bit stream includes a plurality of audio frames. When the multimedia file is recorded, an audio/video recording system has to record the timing and order of each video frame of the video bit stream and the timing and order of each audio frame of the audio bit stream. When the multimedia file is requested to be rendered, an audio/video player renders the video frames and audio frames of the multimedia file according to the rendering time and order.

In addition, the audio/video recording system adopts the MPEG-4 standard and records the sequence and the rendering times of the video frames and the audio frames in a frame table (referring to international standard ISO/IEC 14496-1). Each video bit stream or audio bit stream has a corresponding frame table; each frame table includes at least one item, and each item further has two fields. Moreover, the first field of the item records a frame number, whereas the second field of the item records a frame duration. Furthermore, the frame duration is meant for a rendering duration of a video frame or an audio frame, whereas the frame number is meant for the number of series of video frames or audio frames which has the same frame duration. This shows that audio/video recording system adopting MPEG-4 standard records the relative timing information but not the absolute timing information of each audio/video frame.

FIG. 1A is an example of a multimedia file complied with the MPEG-4 standard. The multimedia file includes a multimedia header 101 and a multimedia data 102. Moreover, the multimedia header 101 includes a video frame table 103, whereas the multimedia data 102 includes a video bit stream 104 and an audio bit stream 124, and the video bit stream 104 further includes video frames 105 to 110.

FIG. 1B is an example of the video frame table 103. In the video frame table 103, each row means an item, and each item includes two fields: video frame number 111 and video frame duration 112. As shown in FIG. 1B, the first item 113 includes two fields (2, 33); that means, in the video bit stream 104 corresponding to the video frame table 103, the rendering duration of the video frame 105 and the video frame 106 are both equal to 33 time unit. Furthermore, the second item 114 includes two fields (1, 34); that means the rendering duration of the following video frame 107 is equal to 34 time unit. Additionally, the third item 115 includes two fields (2, 33); that means the rendering duration of the video frame 108 and the video frame 109 following the video frame 107 are both equal to 33 time unit.

FIG. 1C corresponds to the video frame table of FIG. 1B and shows the relative relationships between the rendering durations of video frames. In addition, the total rendering duration can be calculated based on the grand total of the number of the video frames and the duration of the video frames.

When an audio/video recording system records a multimedia file, various recording events may happen, such as, starting, resuming, stopping, pausing, frame loss, and audio/video synchronization correction. These recording events may cause an asynchronous error between a video bit stream and an audio bit stream of the multimedia file when the multimedia file is requested to play.

FIG. 2A and FIG. 2B show examples of the asynchronous error of an audio/video recorder caused by a paused recording event and a resumed recording event respectively in the prior art. In a MPEG-4 multimedia file recorded based on the audio/video recording system in the prior art, the duration of video frames and audio frames are both definite values. That is to say, the audio/video recording system records an audio frame with every period of time $D_A$ and records a video frame with every period of time $D_V$.

FIG. 2A illustrates the relationship between audio frames and video frames as a paused recording event occurs. As shown in FIG. 2A, a paused recording event occurs at time $T_P$; the last audio frame of the audio bit stream 210 is audio frame 211, and the total recording time of the audio bit stream 210 is $5D_A$. Moreover, when the paused recording event occurs, the last video frame of the video bit stream 212 is video frame 213, and the total recording time of the video bit stream 212 is $3D_V$. It should be noted that, the total recording time ($5D_A$) of the audio bit stream 210 is not equal to the total recording time ($3D_V$) of the video bit stream 212.

FIG. 2B illustrates the relationship between audio frames and video frames as a resumed recording event occurs. When the resumed recording event occurs, the first audio frame 214 is played at $5D_A$, whereas the first video frame 215 is displayed at $3D_V$. This phenomenon results in an asynchronous error between the video bit stream 212 and the audio bit stream 210; that is to say, a time difference (dT) of ($3D_V-5D_A$) occurs when the multimedia file is displayed.

Accordingly, a major objective of the invention is to provide a method and an apparatus for determining a rendering duration. More particularly, utilization of the method and apparatus of the invention to determine the rendering duration of video frames of a multimedia file can help to eliminate an asynchronous error between a video bit stream and an audio bit stream, so as to solve the asynchronous problem of video and audio signals when the multimedia file is displayed.

SUMMARY OF THE INVENTION

The objective of the present invention is to provide a method and apparatus for determining a rendering duration. Generally, an audio/video recording system is applied to record, according to a recording event, an audio bit stream and a video bit stream of a multimedia object. Moreover, the audio bit stream includes a plurality of audio frames, whereas the video bit stream includes N video frames, wherein N is a positive integer larger than 1. The method and the apparatus of the present invention are applied to determine a rendering duration corresponding to an event video frame of the recording event, according to the recording event and the time for recording the audio frames and the video frames. According to this invention, when the (i+1)th video frame through the (i+$N_L$)th video frame are lost, the rendering duration of the ith video frame is determined based on $N_L$. According to this invention, when the system receives a command of synchronization correction for the ith video frame, the rendering duration of the ith video frame is determined based on a correction value. Additionally, i is an integer index within the range of 1 to (N−1), and $N_L$ is a positive integer smaller than N.

According to a preferred embodiment of the invention, in a situation of a start/resume recording event, a method for determining a rendering duration of the start/resume event video frame is provided. The method first calculates a difference (E), according to an audio start/resume recording time ($T_{AO}$) of an event audio frame corresponding to the start/resume event records and a video start/resume recording time ($T_{VO}$) of the event video frame. Then, the method determines the rendering duration ($D_{RE}$) of the first video frame, according to the difference (E) and a predefined video frame period ($D_V$) of the video bit stream, and a start/resume event item (1, $D_{RE}$) is filled into the video frame table of the multimedia file.

According to a preferred embodiment of the invention, in the situation of a stop/pause recording event, a method for determining a rendering duration of the stop/pause event video frame is provided. The method first calculates a difference (E), according to an audio stop/pause recording time ($T_{AE}$) of an event audio frame corresponding to the stop/pause recording event record and a video stop/pause recording time ($T_{VE}$) of the event video frame. Then, the method determines the rendering duration ($D_{RE}$) of the last video frame, according to the difference (E) and a predefined audio frame period ($D_A$) of the audio bit stream, and the stop/pause recording event items ($N_v-1$, $D_V$) and (1, $D_{RE}$) are filled into a video frame table of a multimedia file sequentially.

According to a preferred embodiment of the invention, when the (i+1)th video frame through the (i+$N_L$)th video frame are lost, a method for determining the rendering duration of the ith video frame of the video bit stream is provided. The method determines the rendering duration ($D_{RE}$) of the ith video frame, according to a predefined video frame period ($D_V$) of the video bit stream and a grand total number of lost video frames ($N_L$), and the video frame lost event items ($N_v-2$, $D_V$), (1, $D_{RE}$), and (1, $D_V$) are filled into the video frame table of the multimedia file sequentially.

According to a preferred embodiment of the invention, when the system receives a command of synchronization correction for the ith video frame, a method for determining the rendering duration of the ith video frame is provided. The method determines the rendering duration ($D_{RE}$) of the ith video frame, according to a predefined video frame period ($D_V$) of the video bit stream and a video frame correction value (dT) for the ith video frame, and the synchronization correction event items ($N_v-1$, $D_V$) and (1, $D_{RE}$) are filled into the video frame table of the multimedia file sequentially.

According to a preferred embodiment of the invention, an apparatus for determining a rendering duration of the event video frame in the video bit stream is provided. Additionally, the apparatus includes a processing module. When the recording event is start/resume event, the processing module records an audio start/resume recording time ($T_{AO}$) of an event audio frame corresponding to the start/resume event and a video start/resume recording time ($T_{VO}$) of the event video frame; then, the processing module determines the rendering duration ($D_{RE}$) of the event video frame, according to a predefined video frame period ($D_V$) of the video bit stream.

According to a preferred embodiment of the invention, an apparatus for determining a rendering duration of the event video frame in the video bit stream is provided. Additionally, the apparatus includes a processing module. When the recording event is stop/pause event, the processing module records an audio stop/pause recording time ($T_{AE}$) of an event audio frame corresponding to the event video frame and a video stop/pause recording time ($T_{VE}$) of the event video frame; the processing module then determines the rendering duration ($D_{RE}$) of the event video frame, according to a predefined audio frame period ($D_A$) of the audio bit stream.

According to a preferred embodiment of the invention, when the (i+1)th video frame through the (i+$N_L$)th video frame are lost, an apparatus for determining a rendering duration of the ith video frame (event video frame) in the video bit stream is provided. Additionally, the apparatus includes a processing module. Furthermore, the processing module determines the rendering duration ($D_{RE}$) of the ith video frame (event video frame), according to a predefined video frame period ($D_V$) of the video bit stream and a grand total number of lost video frames ($N_L$).

According to a preferred embodiment of the invention, when the system receives a command of synchronization correction for the ith video frame (event video frame), an apparatus for determining the rendering duration of the ith video frame (event video frame) is provided. Additionally, the apparatus includes a processing module. Furthermore, the processing module determines the rendering duration ($D_{RE}$) of the ith video frame (event video frame), according to a predefined video frame period ($D_V$) of the video bit stream and a video frame correction value (dT) for the ith video frame.

The scope of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 1A is an example of a multimedia file complied with the MPEG-4 standard.

FIG. 1B is an example of a video frame table.

FIG. 1C corresponds to the video frame table of FIG. 1B and shows the relative relationships between the rendering durations of video frames.

Figure 2A:
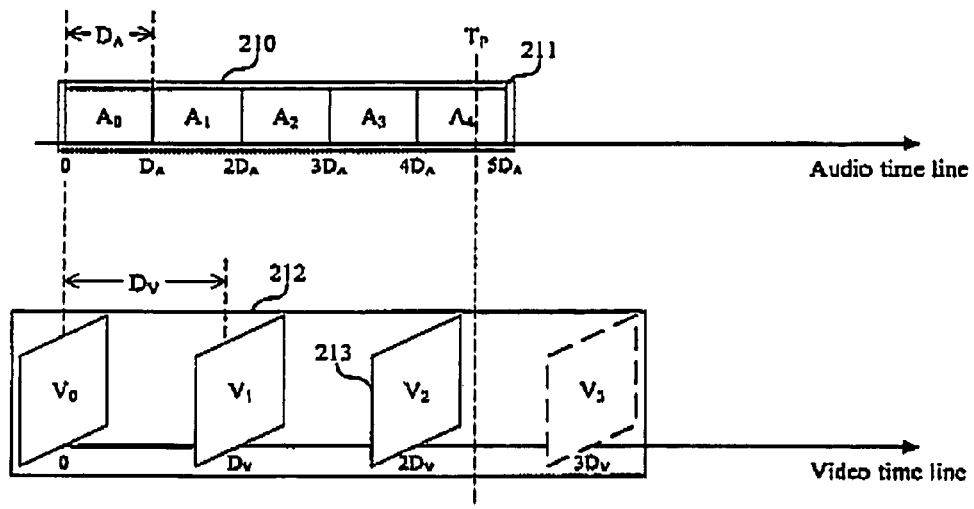

FIG. 2A illustrates the relationship between audio frames and video frames in a paused recording event.

Figure 2B:
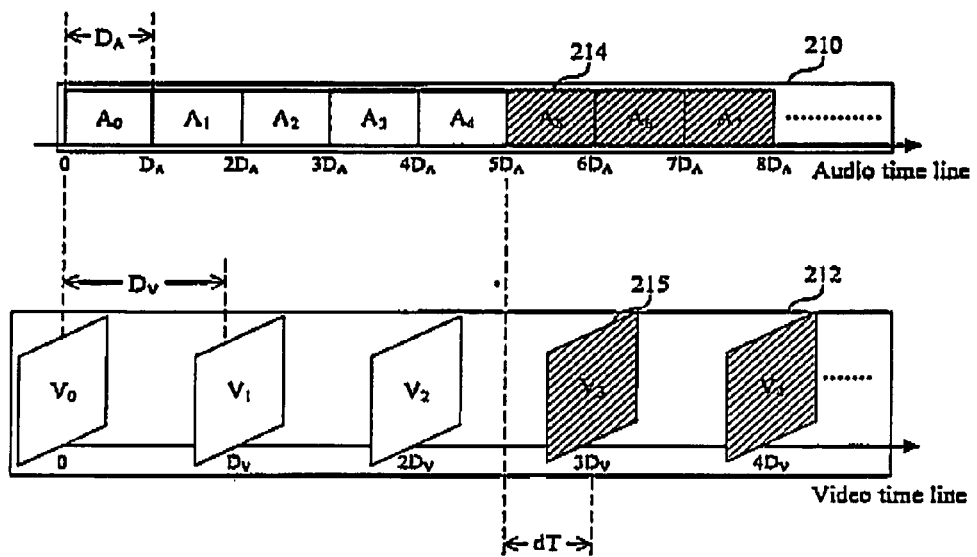

FIG. 2B illustrates the relationship between audio frames and video frames in a resumed recording event.

Figure 3A:
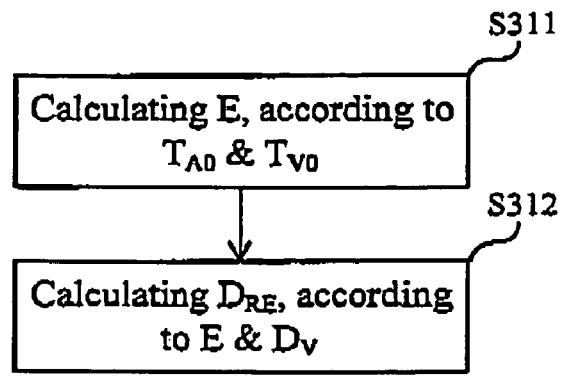

FIG. 3A shows a flow chart of the method of the first preferred embodiment of the invention.

Figure 3B:
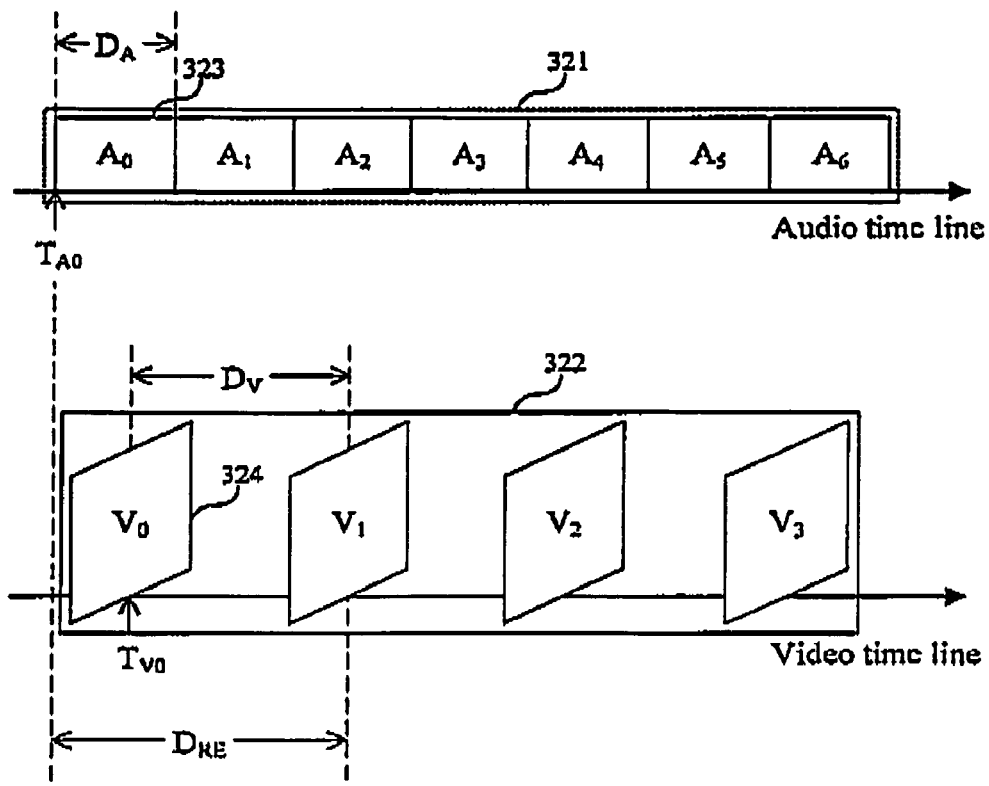

FIG. 3B illustrates the relationship between an audio bit stream and a video bit stream when a system starts/resumes recording a multimedia file.

Figure 4A:
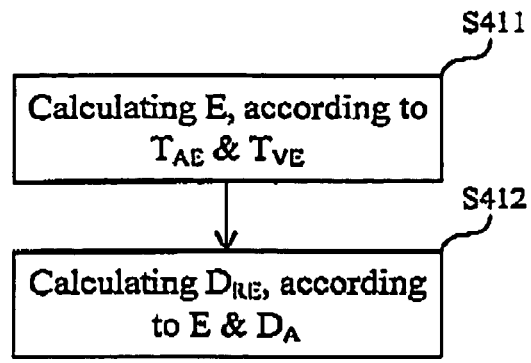

FIG. 4A shows a flow chart of the method of the second preferred embodiment of the invention.

Figure 4B:
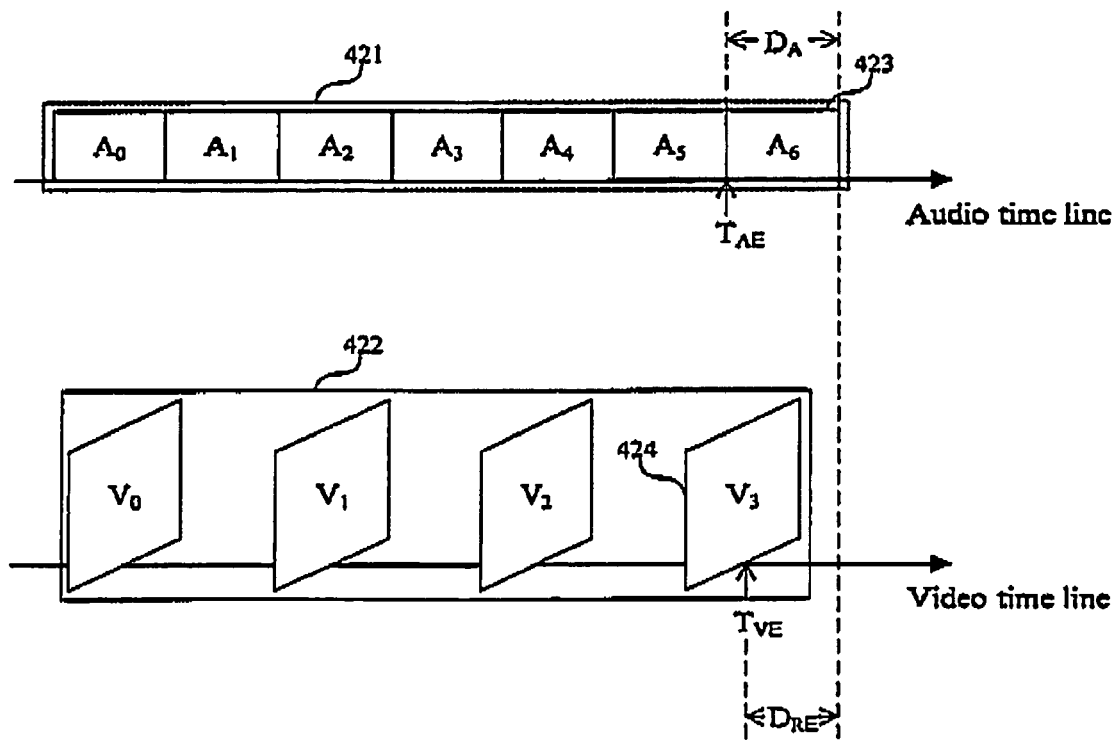

FIG. 4B illustrates the relationship between an audio bit stream and a video bit stream when a system stops/pauses recording a multimedia file.

Figure 5:
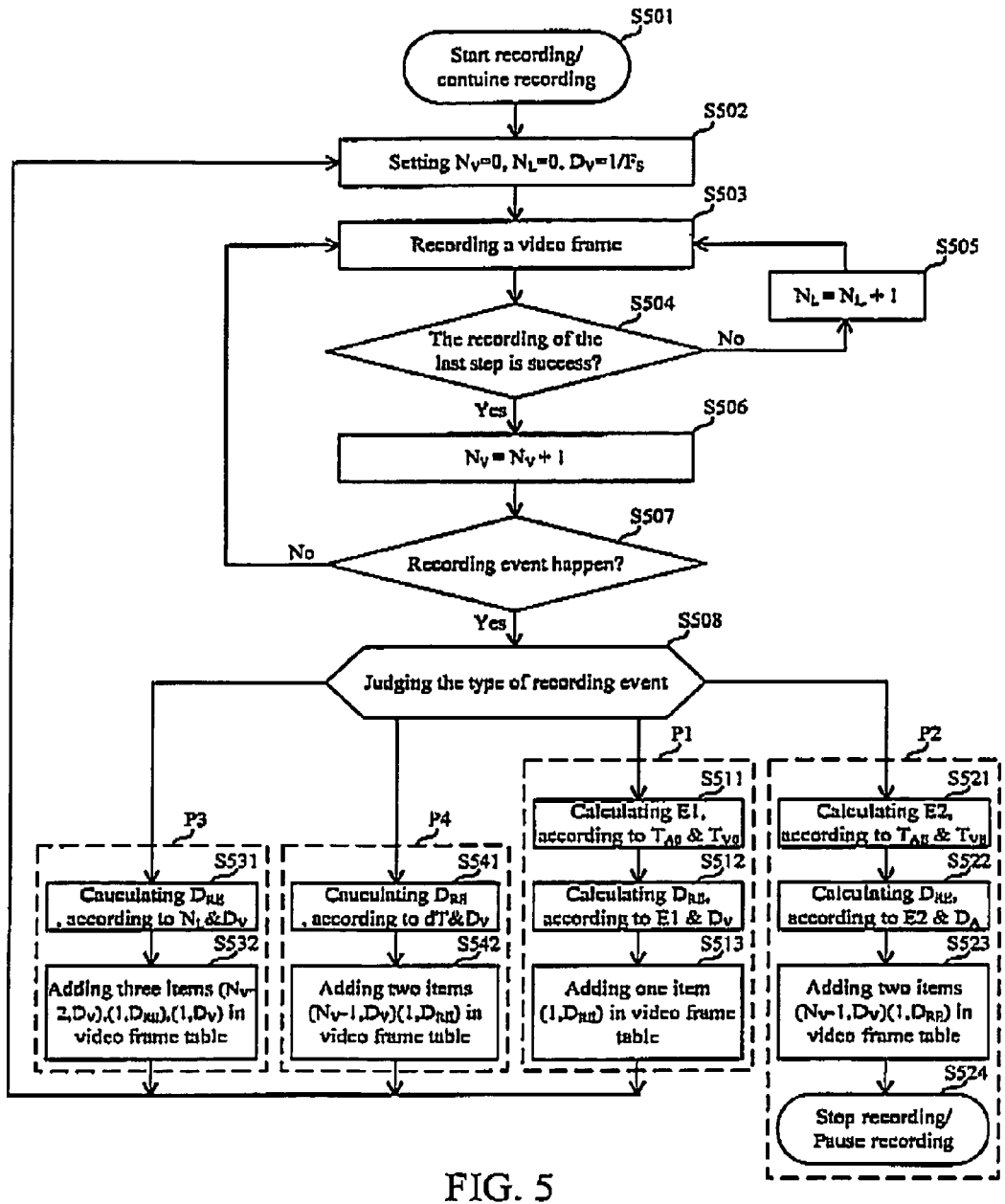

FIG. 5 shows a flow chart of a method including the first preferred embodiment through the fourth preferred embodiment of the invention.

Figure 6:
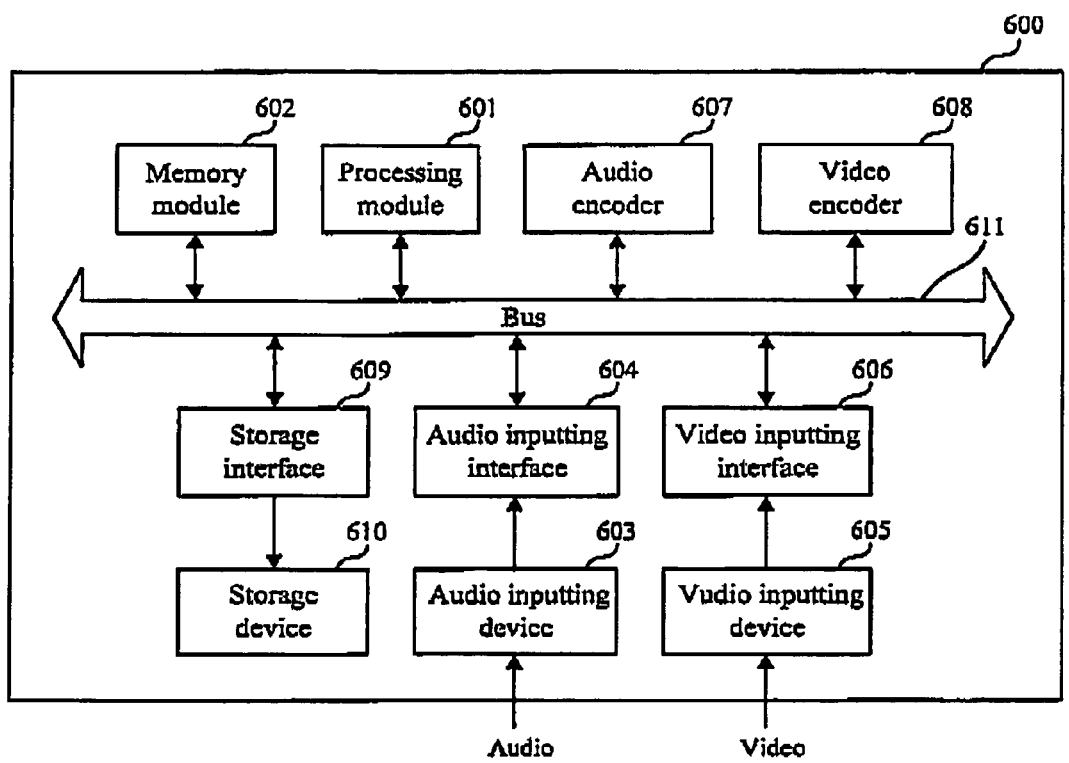

FIG. 6 shows a functional block diagram of an audio/video recording system of a preferred embodiment of the invention.

DETAILED DESCRIPTION OF THE INVENTION

The objective of the present invention is to provide a method and apparatus for determining a rendering duration. Furthermore, the present invention can be applied in an audio/video recording system to record a multimedia object, such as a multimedia file. Moreover, the multimedia object has an audio frame table, a video frame table, an audio bit stream, and a video bit stream. Additionally, the audio bit stream includes a plurality of audio frames, whereas the video bit stream includes a plurality of video frames; for example, the video bit stream has N video frames, wherein N is a positive integer larger than 1. The method and apparatus of the invention can determine, according to the time of which the audio/video recording system recorded the audio frames and the video frames and a recording event, the rendering duration of an event video frame corresponding to the recording event; then, the rendering duration of the event video frame is filled into the video frame table of the multimedia file. In addition, the rendering duration of the event video frame can be temporarily stored in a memory and can be filled into the video frame table after the recording is completed. Furthermore, the recording event includes the following patterns: start/resume event, stop/pause event, video frame lost event, and synchronization correction event. According to this invention, when the (i+1)th video frame through the (i+$N_L$)th video frame are lost, the rendering duration of the ith video frame is determined based on $N_L$. According to this invention, when the system receives a command of synchronization correction for the ith video frame, the rendering duration of the ith video frame is determined based on a correction value. Additionally, i is an integer index within the range of 1 to (N−1), and $N_L$ is a positive integer smaller than N.

The First Preferred Embodiment

Referring to FIG. 3A, the flowchart of the method of a preferred embodiment of the invention is disclosed therein. According to the preferred embodiment, when the audio/video recording system records an event video frame in a start/resume recording event situation, the method is used to determine a rendering duration of the start/resume event video frame and to fill the rendering duration in the video frame table of the multimedia file. Firstly, in step S311, the method records, according to the start/resume recording event, an audio start/resume recording time ($T_{A0}$) of an event audio frame corresponding to the recording event and a video start/resume recording time ($T_{V0}$) of the event video frame, and then it calculates a difference (E) between $T_{A0}$ and $T_{V0}$. Then, in step S312, the method determines, according to the difference (E) and a predefined video frame period ($D_V$) of the video bit stream, the rendering duration ($D_{RE}$) of the event video frame, and the rendering duration ($D_{RE}$) is filled into the video frame table of the multimedia file. It should be noted that the predefined video frame period ($D_V$) can be defined as a reciprocal of a video sampling frequency ($F_S$), so it is a definite value.

In practice, the difference (E) is calculated via the following equation:

$$E = T_{A0} - T_{V0}$$

In practice, the rendering duration ($D_{RE}$) is calculated via the following equation:

$$D_{RE} = D_V - E, \text{ which is equal to}$$

$$D_{RE} = D_V + T_{V0} - T_{A0}$$

In practice, an audio/video recording system adopting MPEG-4 standard performs processes as shown in FIG. 3A to calculate the rendering duration ($D_{RE}$) Furthermore, according to the start/resume recording event and the rendering duration ($D_{RE}$), the audio/video recording system adds a start/resume recording event item (1, $D_{RE}$) in the video frame table of the multimedia file related to the event video frame; that is to say, the number of the event video frame is 1, and the rendering duration of the event video frame is $D_{RE}$.

Please refer to FIG. 3B in view of FIG. 3A. The audio/video recording system adopting MPEG-4 standard is used to record an audio bit stream 321 and a video bit stream 322 in a multimedia file. When the audio/video recording system starts or resumes to record the multimedia file under a start/resume recording event situation, the relationship between the audio bit stream 321, the video bit stream 322, and recording time is disclosed in FIG. 3B. As shown in FIG. 3B, the audio frame 323 with serial number $A_0$ is the start/resume recording event audio frame of the audio bit stream 321, whereas the video frame 324 with serial number $V_0$ is the start/resume recording event video frame of the video bit stream 322. According to the method as shown in FIG. 3A, the system can adjust the rendering duration of the start/resume event video frame 324 from $D_V$ to $D_{RE}$ and can fill the start/resume recording event item (1, $D_{RE}$) in the video frame table of the multimedia file, so as to prevent the asynchronous problem when the multimedia file is displayed.

The Second-Preferred Embodiment

Referring to FIG. 4A, the flowchart of the method of the second preferred embodiment of the invention is disclosed therein. According to the preferred embodiment, when the audio/video recording system records an event video frame under a stop/pause recording event situation, the method is used to determine a rendering duration of the stop/pause event video frame and to fill the rendering duration in the video frame table of the multimedia file. Firstly, in step S411, the method records, according to the stop/pause event, an audio stop/pause recording time ($T_{AE}$) of an event audio frame corresponding to the recording event and a video stop/pause recording time ($T_{VE}$) of the event video frame, and then it calculates a difference (E) between $T_{AE}$ and $T_{VE}$. Then, in step S412, the method determines, according to the difference (E) and a predefined audio frame period ($D_A$) of the audio bit stream, the rendering duration ($D_{RE}$) of the event video frame, and it also fills the rendering duration ($D_{RE}$) in the video frame table of the multimedia file. It should be noted that the predefined audio frame period ($D_A$) can be defined as a product of a reciprocal of an audio sampling frequency ($F_A$) and the predetermined frame size ($S_F$), $D_A = (1/F_A)*S_F$, which is a definite value.

In practice, the difference (E) is calculated via the following equation:

$$E = T_{AE} - T_{VE}$$

In practice, the rendering duration ($D_{RE}$) is calculated via the following equation:

$$D_{RE} = D_A + E, \text{ which is equal to}$$

$$D_{RE} = D_A + T_{AE} - T_{VE}$$

In practice, an audio/video recording system adopting MPEG-4 standard performs processes as shown in FIG. 4A to calculate the rendering duration ($D_{RE}$) Furthermore, the audio/video recording system sequentially adds the stop/pause event items ($N_v-1$, $D_V$) and (1, $D_{RE}$) in the video frame table of the multimedia file related to the event video frame, according to the stop/pause recording event, a predefined video frame period ($D_V$), a grand total number of video frames ($N_v$), and the rendering duration ($D_{RE}$). This is to say, the number of the normal video frames before the event video frame is $N_v-1$, the period of all the normal videos is $D_V$, the number of the event video frame is 1, and the rendering duration of the event video frame is $D_{RE}$.

Please refer to FIG. 4B in view of FIG. 4A. The audio/video recording system adopting MPEG-4 standard is used to record an audio bit stream 421 and a video bit stream 422 in a multimedia file. When the audio/video recording system stops or pauses to record the multimedia file under a stop/pause recording event situation, the relationship between the audio bit stream 421, the video bit stream 422, and recording time is disclosed in FIG. 4B. As shown in FIG. 4B, the audio frame 423 with serial number $A_6$ is the stop/pause recording event audio frame of the audio bit stream 421, whereas the video frame 424 with serial number $V_3$ is the stop/pause recording event video frame of the video bit stream 422. According to the method as shown in FIG. 4A, the system can adjust the rendering duration of the stop/pause recording event video frame 424 from $D_V$ to $D_{RE}$, and it then fills the stop/pause recording event items $(N_v-1, D_V)$ and $(1, D_{RE})$ in the video frame table of the multimedia file, so as to prevent the asynchronous problem when the multimedia file is displayed.

The Third Preferred Embodiment

The third preferred embodiment of the invention is a method for determining a rendering duration of the ith video frame (the event video frame) of the video bit stream when the (i+1)th video frame through the $(i+N_L)$th video frame are lost; that is to say, the audio/video recording system is in a video frame lost situation. The method determines the rendering duration $(D_{RE})$ of the ith video frame (the event video frame), according to a predefined video frame period $(D_V)$ of the video bit stream and a grand total number of lost video frames $(N_L)$, and it fills the rendering duration $(D_{RE})$ in the video frame table of the multimedia file sequentially.

In practice, the rendering duration $(D_{RE})$ is calculated via the following equation:

$$D_{RE}=(1+N_L)*D_V$$

In practice, an audio/video recording system adopting the MPEG-4 standard is applied to perform the method hereinbefore and to add the video frame lost event items $(N_v-2, D_V)$, $(1, D_{RE})$, and $(1, D_V)$ in the video frame table related to the ith video frame (the event video frame), according to the video frame lost event, the predefined video frame period $(D_V)$ of the video bit stream, a grand total number of lost video frames $(N_L)$, and the rendering duration $(D_{RE})$. That is to say, the number of the normal video frames before the lost event is $N_v-2$, the period of each normal video frame is $D_V$, the number of the event video frame is 1, and the rendering duration of the event video frame is $D_{RE}$. The video frame after the lost event is a normal video frame with the period $D_V$.

In practice, when the video frame lost event occurs in the system, an audio/video recording system adopting MPEG-4 standard uses the method as described above to elongate the rendering duration of the ith video frame (the event video frame) to $D_{RE}$, so as to replace the lost video frames, and it then sequentially fills the video frame lost event items $(N_v-2, D_V)$, $(1, D_V)$, and $(1, D_V)$ in the video frame table of the multimedia file, so as to prevent the asynchronous problem when the multimedia file is displayed.

The Fourth Preferred Embodiment

The method of the fourth preferred embodiment of the invention determines the rendering duration of the ith video frame (the event video frame) of the video bit stream when the system receives a command of synchronization correction for the ith video frame; that is to say, the audio/video recording system is in a synchronization correction situation. The method determines the rendering duration $(D_{RE})$ of the ith video frame, according to a predefined video frame period $(D_V)$ of the video bit stream and a video frame correction value (dT) for the ith video frame, and it then fills the rendering duration $(D_{RE})$ in the video frame table of the multimedia file.

In practice, the rendering duration $(D_{RE})$ is calculated via the following equation:

$$D_{RE}=D_V-dT$$

In practice, an audio/video recording system adopting MPEG-4 standard uses the method as described above to newly add the synchronization correction event items $(N_v-1, D_V)$ and $(1, D_{RE})$ in the video frame table related to the ith video frame (the event video frame), according the synchronization correction event, the predefined video frame period $(D_V)$ of the video bit stream, a grand total number of video frames $(N_V)$, and the rendering duration $(D_{RE})$; it then fills the synchronization correction event items $(N_v-1, D_V)$ and $(1, D_V)$ in the video frame table of the multimedia file, so as to prevent the asynchronous problem when the multimedia file is displayed. Moreover, the meanings of the synchronization correction event items $(N_v-1, D_V)$ and $(1, D_{RE})$ are as follows: the number of normal video frames before the synchronization correction event is $N_v-1$, the period of each normal video frame is $D_V$, the number of the synchronization correction event video frame is 1, and the rendering duration of the event video frame is $D_{RE}$.

In practice, an audio/video recording system is known to have a reference frequency different from an ideal value; therefore, the system utilizes the apparatus as mentioned above to correct the rendering duration of the ith video frame.

In practice, an audio/video recording system adopting MPEG-4 standard can use a method that includes the methods of the first through the fourth preferred embodiment of the invention. The system records the sequence and the rendering duration of video frames in a video frame table. Referring to FIG. 5, a flow chart of the method is disclosed therein. In step S501, the system receives a command to start or resume recording an audio bit stream and a video bit stream. Then in step S502, the system sets a grand total number of video frames $(N_V)$ and a grand total of lost video frames $(N_L)$ as 0, and it sets a predefined video frame period $(D_V)$ to be a reciprocal of a video sampling frequency $(F_S)$. Afterward, the system records a video frame in step S503. Then, in S504, the system judges if the recording in step S503 is successful or not. If the result of step S504 is NO, step S505 is processed, so as to let $N_L=N_L+1$, and step S503 and S504 are repeated after step S505 until the result of step S504 turns to YES. On the contrary, if the result of step S504 is YES, step S506 is processed, so as to let $N_V=N_V+1$. After step S506, step S507 is performed to judge if any recording event is happening. If the result of step S507 is NO, step S503 to S507 are repeated until the result of step S507 turns to YES, and the recorded video frame is an event video frame. Subsequently, the type of the recording event is judged in step S508. If the recording event is a start/resume recording event, procedure P1 which includes step S511 to step S513 is performed. In step S511, the system calculates a first difference E1, according to an audio start/resume recording time $(T_{A0})$ of an event audio frame corresponding to the event video frame and a video start/resume recording time $(T_{V0})$ of the event video frame. Furthermore, in step S512, the system determines the rendering duration $(D_{RE})$ of the event video frame, according to E1 and $D_V$. Moreover, in step S513, the system adds a start/resume event item $(1, D_{RE})$ in the video frame table, and it fills the start/resume event item $(1, D_{RE})$ in the video frame table of the multimedia file. When step S513 is accomplished, the system goes back to step S502. However, if the recording event is a stop/pause recording event, procedure P2 which includes step S521 to step S523 is performed. In step S521, the system calculates a second difference E2, according to an audio stop/pause recording time ($T_{AE}$) of an event audio frame corresponding to the event video frame and a video stop/pause recording time ($T_{VE}$) of the event video frame. Furthermore, in step S522, the system determines the rendering duration ($D_{RE}$) of the event video frame, according to E2 and $D_A$. Moreover, in step S523, the system adds two stop/pause items ($N_V$–1, $D_V$) and (1, $D_{RE}$) in the video frame table, and these two items are filled in the video frame table of the multimedia file sequentially. After step S523 is accomplished, the system stops or pauses recording in step S524. Furthermore, if the recording event is a video frame lost event, and the (i+1)th video frame through the (i+$N_L$)th video frame of the video bit stream are lost, procedure P3 which includes step S531 and S532 is performed. In step S531, the system determines the rendering duration ($D_{RE}$) of the ith video frame, according to a predefined period ($D_V$) of the video bit stream and a grand total number of lost video frames ($N_L$). Furthermore, in step S532, the system adds three video frame lost event items ($N_V$–2, $D_V$), (1, $D_{RE}$), and (1, $D_V$) in the video frame table, and the video frame lost event items are filled in the video frame table of the multimedia file sequentially. After step S532 is accomplished, the system goes back to step S502. Finally, if the recording event is a synchronization correction event, procedure P4 which includes step S541 and S542 is performed. In step S541, the system determines the rendering duration ($D_{RE}$) of the ith video frame, according to a predefined period ($D_V$) of the video bit stream and a video frame correction value (dT) for the ith video frame. Moreover, in step S542, the system adds two synchronization correction event items ($N_V$–1, $D_V$) and (1, $D_{RE}$) in the video frame table related to the ith video frame, and these two synchronization correction event items are filled in the video frame table of the multimedia file sequentially. After step S542 is accomplished, the system goes back to step S502.

FIG. 6 shows a functional block diagram of an audio/video recording system 600 of a preferred embodiment of the invention. Additionally, the audio/video recording system 600 includes a processing module 601, a memory module 602, an audio inputting device 603, an audio inputting interface 604, a video inputting device 605, a video inputting interface 606, an audio encoder 607, a video encoder 608, a storage interface 609, a storage device 610, and a bus 611. In detail, each of the modules, devices, interfaces, and encoders in the audio/video recording system 600 connects with each other through the bus 611. Furthermore, the audio encoder 607 and the video encoder 608 can be designed as software and can be executed in the processing module 601 or be carried out by a digital signal processor (DSP). The processing module 601, such as ARM micro-processor, is used to perform an audio/video recording program in the memory module 502, such as SDRAM. The audio inputting device 603, such as a microphone, is used to collect audio signals, whereas the audio inputting interface 604 is used to connect the audio inputting device 603 with the bus 611. Furthermore, the collected audio data will be stored in the memory module 602. Additionally, the video inputting device 605, such as CMOS sensor, is used to collect images, whereas the video inputting interface 606 is used to connect the video inputting device 605 and the bus 611. Furthermore, the collected video data will be stored in memory module 602. The audio encoder 607, such as MPEG-4 AAC audio encoder, encodes the audio data stored in the memory module 602 into audio frames, whereas the video encoder 608, such as MPEG-4 video encoder, encodes the video data stored in the memory module 602 into video frames. The storage interface 609 is used to connect the storage device 610 with the bus 611, whereas the storage device 610, such as SD card, is used to store the multimedia file composed by the video frames and the audio frames. In addition, the system structure of FIG. 6 can be suitable for application in a system on a chip, a portable cam-coder, a home audio/video recorder, and audio/video play/record converter.

When a user request the system to start recording, the processing module 601 of the audio/video recording system 600 carries out the audio/video recording program according to the invention in the memory module 602. First of all, the processing module 601 sets a grand total number of video frames ($N_V$) and a grand total of lost video frames ($N_L$) to 0 and sets a predefined video frame period ($D_V$) to be a reciprocal of a video sampling frequency ($F_S$); then, it controls the audio inputting interface 604 to trigger the audio inputting device 603 and further controls the video inputting interface 606 to trigger the video inputting device 605. Afterward, the audio inputting interface 604 obtains the audio data from the audio inputting device 603, whereas the video inputting interface 606 obtains the video data from the video inputting device 605. When these data is obtained, the audio inputting interface 604 and/or the video inputting interface 606 informs the processing module 601 to process the data. Accordingly, the processing module 601 moves the audio data and/or the video data to the memory module 602 via the bus 611; it then controls the audio encoder 607 to compress the audio data to audio frames and controls the video encoder 608 to compress the video data to video frames.

Consequently, the processing module 601 judges if the recording of the video frames is successful or not. If the recording is successful, the processing module 601 lets $N_V$=$N_V$+1, and if the recording is not successful, the processing module 601 lets $N_L$=$N_L$+1. When the recording is successful, the processing module 601 further judges if any recording event is happening. If no recording event has happened, the processing module 601 obtains the audio data and the video data through the audio inputting device 603 and the video inputting device 605, and it further converts these data into corresponding audio frames and video frames. On the contrary, if a recording event is happening, the processing module 601 judges the type of recording event, including start/resume event, stop/pause event, video frame lost event, and synchronization correction event. Afterward, the processing module 601 calculates the rendering duration $D_{RE}$ of the event video frame corresponding to the recording event and temporarily stores the event item (1, $D_{RE}$) in the memory module 602 through the bus 611. Furthermore, according to the format of the audio/video file, the processing module 601 composes the corresponding event item, the audio frames, and the video frames into the multimedia file, and it writes the file into the storage device 610 through the bus 611, via the storage interface 609.

The Fifth Preferred Embodiment

Please refer to FIG. 5 in regards with FIG. 6. When the recording event is a start/resume event, the processing module 601 of the audio/video recording system 600 records an audio start/resume recording time ($T_{AO}$) of an event audio frame corresponding to the start/resume recording event and a video start/resume recording time ($T_{VO}$) of the event video frame. The processing module 601 further determines, according to a predefined period ($D_V$) of the video bit stream, the rendering duration ($D_{RE}$) of the event video frame.

In practice, the difference (E) is calculated via the following equation:

$$E = T_{A0} - T_{V0}$$

In practice, the rendering duration ($D_{RE}$) is calculated via the following equation:

$$D_{RE} = D_V - E, \text{ which is equal to}$$

$$D_{RE} = D_V + T_{V0} - T_{A0}$$

In practice, the processing module 601 of the audio/video recording system 600 adopting MPEG-4 standard fills a start/resume event item $(1, D_{RE})$ related to the event video frame in the video frame table of the multimedia file after the rendering duration $D_{RE}$ of the event video frame is determined, and it writes the start/resume event item $(1, D_{RE})$ into the storage device 610, via the bus 611 and the storage interface 609.

The Sixth Preferred Embodiment

Please refer to FIG. 5 in regards with FIG. 6. When the recording event is a stop/pause event, the processing module 601 of the audio/video recording system 600 records an audio stop/pause recording time ($T_{AE}$) of an event audio frame corresponding to the stop/pause event and a video stop/pause recording time ($T_{VE}$) of the event video frame. The processing module 601 further determines, according to a predefined period ($D_A$) of the audio bit stream, the rendering duration ($D_{RE}$) of the event video frame.

In practice, the difference (E) is calculated via the following equation:

$$E = T_{AE} - T_{VE}$$

In practice, the rendering duration ($D_{RE}$) is calculated via the following equation:

$$D_{RE} = D_A + E, \text{ which is equal to}$$

$$D_{RE} = D_A + T_{AE} - T_{VE}$$

In practice, the processing module 601 of the audio/video recording system 600 adopting MPEG-4 standard fills the stop/pause event items $(N_v-1, D_V)$ and $(1, D_{RE})$ in the video frame table of the multimedia file related to the event video frame, after the rendering duration $D_{RE}$ of the event video frame is determined, and it writes the stop/pause event items $(N_V-1, D_V)$ and $(1, D_{RE})$ into the storage device 610, via the bus 611 and the storage interface 609.

The Seventh Preferred Embodiment

Please refer to FIG. 5 in regards with FIG. 6. When the recording event is a video frame lost event, the processing module 601 of the audio/video recording system 600 judges the $(i+1)$th video frame through the $(i+N_L)$th video frame are lost; then, the processing module 601 of the audio/video recording system 600 determines the rendering duration ($D_{RE}$) of the ith video frame, according to a predefined period ($D_V$) of the video bit stream and a grand total number of lost video frames ($N_L$).

In practice, the rendering duration ($D_{RE}$) is calculated via the following equation:

$$D_{RE} = (1+N_L)*D_V$$

In practice, the processing module 601 of the audio/video recording system 600 adopting MPEG-4 standard fills the video frame lost event items $(N_v-2, D_V)$, $(1, D_{RE})$ and $(1, D_V)$ in the video frame table of the multimedia file related to the event video frame, after the rendering duration $D_{RE}$ of the ith video frame (the event video frame) is determined, and it writes the video frame lost event items $(N_v-2, D_V)$, $(1, D_{RE})$ and $(1, D_V)$ into the storage device 610, via the bus 611 and the storage interface 609.

In practice, an audio/video recording system adopting MPEG-4 standard applies the apparatus as described above to elongate the rendering duration of the ith video frame to $D_{RE}$, so as to replace the lost video frames.

The Eighth Preferred Embodiment

Please refer to FIG. 5 in regards with FIG. 6. When the recording event is a synchronization correction event, the processing module 601 of the audio/video recording system 600 receives a command of synchronization correction for the ith video frame; the processing module 601 determines the rendering duration ($D_{RE}$) of the ith video frame, according to a predefined period ($D_V$) of the video bit stream and a video frame correction value (dT) for the ith video frame.

In practice, the rendering duration ($D_{RE}$) is calculated via the following equation:

$$D_{RE} = D_V - dT$$

In practice, the processing module 601 of the audio/video recording system 600 adopting MPEG-4 standard fills synchronization correction event items $(N_v-1, D_V)$ and $(1, D_{RE})$ in the video frame table of the multimedia file related to the event video frame, after the rendering duration $D_{RE}$ of the ith video frame is determined, and it writes the synchronization correction event items $(N_v-1, D_V)$ and $(1, D_{RE})$ into the storage device 610, via the bus 611 and the storage interface 609.

In practice, an audio/video recording system is known to have a reference frequency different from an ideal value, therefore, the system utilizes the apparatus as mentioned above to correct the rendering duration of the ith video frame.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and mounteds of the appended claims.

What is claimed is:

1. A method for determining a rendering duration, for applying in an audio/video recording system to record a multimedia object comprising a video frame table, an audio bit stream, and a video bit stream, and said audio bit stream comprising a plurality of audio frames, and said video bit stream comprising a plurality of video frames, the method comprising the following steps:

recording an event video frame;

judging a recording event corresponding to the event video frame;

calculating, according to the recording event, the rendering duration ($D_{RE}$) corresponding to the event video frame; and adjusting a duration of the event video frame according to the rendering duration ($D_{RE}$) and filling the rendering duration ($D_{RE}$) in the video frame table of the multimedia object.

2. The method of claim 1, wherein the step of filling the rendering duration ($D_{RE}$) in the video frame table of the multimedia object further comprises the step of temporarily storing the rendering duration ($D_{RE}$) in a memory, and then filling it in the video frame table of the multimedia object.

3. The method of claim 1, wherein when the recording event is a start/resume event, the step of calculating the rendering duration ($D_{RE}$) corresponding to the event video frame further comprises the step of:

determining the rendering duration ($D_{RE}$), according to an audio start/resume recording time ($T_{A0}$) of an event audio frame corresponding to the event video frame, a video start/resume recording time ($T_{V0}$) of the event video frame, and a predefined period ($D_V$) of video frame, and the rendering duration ($D_{RE}$) being calculated via the following equation:

$$D_{RE}=D_V+T_{V0}-T_{A0}.$$

4. The method of claim 3, wherein the step of filling the rendering duration ($D_{RE}$) in the video frame table of the multimedia object is to newly add a start/resume event item $(1, D_{RE})$ and to fill said start/resume event item $(1, D_{RE})$ in the video frame table of the multimedia object.

5. The method of claim 1, wherein when the recording event is a stop/pause event, the step of calculating the rendering duration ($D_{RE}$) corresponding to the event video frame further comprises the step of:

determining the rendering duration ($D_{RE}$), according to an audio stop/pause recording time ($T_{AE}$) of an event audio frame corresponding to the event video frame, a video stop/pause recording time ($T_{VE}$) of the event video frame, and a predefined period ($D_A$) of audio frame, and the rendering duration ($D_{RE}$) being calculated via the following equation:

$$D_{RE}=D_A+T_{AE}-T_{VE}.$$

6. The method of claim 5, wherein the step of filling the rendering duration ($D_{RE}$) in the video frame table of the multimedia object is to newly add stop/pause event items ($N_v-1, D_V$) and $(1, D_{RE})$, according to a predefined period ($D_V$) of video frame, a grand total number of video frames ($N_V$), and the rendering duration ($D_{RE}$), and to fill said stop/pause event items ($N_v-1, D_V$) and $(1, D_{RE})$ in the video frame table of the multimedia object sequentially.

7. The method of claim 1, wherein when the recording event is a video frame lost event, the step of calculating the rendering duration ($D_{RE}$) corresponding to the event video frame further comprises the step of:

determining the rendering duration ($D_{RE}$), according to a grand total number of lost video frames ($N_L$) and a predefined period ($D_V$) of video frame, and the rendering duration ($D_{RE}$) being calculated via the following equation:

$$D_{RE}=(1+N_L)\times D_V.$$

8. The method of claim 7, wherein the step of filling the rendering duration ($D_{RE}$) in the video frame table of the multimedia object is to newly add video frame lost event items ($N_v-2, D_V$), $(1, D_{RE})$ and $(1, D_V)$ and to fill said video frame lost event items ($N_v-2, D_V$), $(1, D_{RE})$ and $(1, D_V)$ in the video frame table of the multimedia object sequentially.

9. The method of claim 1, wherein when the recording event is a synchronization correction event, the step of calculating the rendering duration ($D_{RE}$) corresponding to the event video frame further comprises the step of:

determining the rendering duration ($D_{RE}$), according to a predefined period ($D_V$) of video frame and a video frame correction value ($dT$), and the rendering duration ($D_{RE}$) being calculated via the following equation:

$$D_{RE}=D_V-dT.$$

10. The method of claim 9, wherein the step of filling the rendering duration ($D_{RE}$) in the video frame table of the multimedia object is to newly add synchronization correction event items ($N_v-1, D_V$) and $(1, D_{RE})$, according to a grand total number of video frames ($N_V$), and to fill said synchronization correction event items ($N_v-1, D_V$) and $(1, D_{RE})$ in the video frame table of the multimedia object sequentially.

11. An apparatus for determining a rendering duration, for recording an audio bit stream and a video bit stream of a multimedia object, and said audio bit stream comprising a plurality of audio frames, and said video bit stream comprising a plurality of video frames, the apparatus comprising:

a video inputting device, for picking a video data;

an audio inputting device, for picking an audio data;

a video encoder, for compressing the video data to generate a video frame;

an audio encoder, for compressing the audio data to generate an audio frame;

a memory module, for temporarily storing an audio/video recording program, the video frame, and the audio frame;

a storage device; for storing a multimedia file; and a processing module, for performing the audio/video recording program, for calculating, according to a recording event, the rendering duration ($D_{RE}$) corresponding to an event video frame, and for adjusting a duration of the event video frame according to the rendering duration ($D_{RE}$) and filling the rendering duration ($D_{RE}$) in a video frame table of the multimedia file.

12. The apparatus of claim 11, wherein the processing module temporarily stores the rendering duration ($D_{RE}$) in the memory module.

13. The apparatus of claim 11, wherein when the recording event is a start/resume event, the processing module determines the rendering duration ($D_{RE}$), according to an audio start/resume recording time ($T_{A0}$) of an event audio frame corresponding to the event video frame, a video start/resume recording time ($T_{V0}$) of the event video frame, and a predefined period ($D_V$) of video frame, and the rendering duration ($D_{RE}$) being calculated via the following equation:

$$D_{RE}=D_V+T_{V0}-T_{A0}.$$

14. The apparatus of claim 13, wherein the processing module newly adds a start/resume event item $(1, D_{RE})$, according to the recording event, and fills said start/resume event item $(1, D_{RE})$ in the video frame table of the multimedia file.

15. The apparatus of claim 11, wherein when the recording event is a stop/pause event, the processing module determines the rendering duration ($D_{RE}$), according to an audio stop/pause recording time ($T_{AE}$) of an event audio frame corresponding to the event video frame, a video stop/pause recording time ($T_{VE}$) of the event video frame, and a predefined period ($D_A$) of audio frame, and the rendering duration ($D_{RE}$) being calculated via the following equation:

$$D_{RE}=D_A+T_{AE}-T_{VE}.$$

16. The apparatus of claim 15, wherein the processing module newly adds stop/pause event items ($N_v-1, D_V$) and $(1, D_{RE})$, according to the recording event, and fills said stop/pause event items ($N_v-1, D_V$) and $(1, D_{RE})$ in the video frame table of the multimedia file.

17. The apparatus of claim 11, wherein when the recording event is a video frame lost event, the processing module determines the rendering duration ($D_{RE}$), according to a grand total number of lost video frames ($N_L$) and a predefined period ($D_V$) of video frame, and the rendering duration ($D_{RE}$) being calculated via the following equation:

$$D_{RE}=(1-N_L) \times D_V.$$

18. The apparatus of claim 17, wherein the processing module newly adds video frame lost event items ($N_v-2$, $D_V$), (1, $D_{RE}$) and (1, $D_V$), according to the recording event, and fills said video frame lost event items ($N_v-2$, $D_V$), (1, $D_{RE}$) and (1, $D_V$) in the video frame table of the multimedia file.

19. The apparatus of claim 11, wherein when the recording event is a synchronization correction event, the processing module determines the rendering duration ($D_{RE}$), according to a predefined period ($D_V$) of video frame and a video frame correction value (dT), and the rendering duration ($D_{RE}$) being calculated via the following equation:

$$D_{RE}=D_V-dT.$$

20. The apparatus of claim 19, wherein the processing module newly adds synchronization correction event items ($N_v-1$, $D_V$) and (1, $D_{RE}$), according to the recording event, and fills said synchronization correction event items ($N_v-1$, $D_V$) and (1, $D_{RE}$) in the video frame table of the multimedia file.

* * * * *